US006911932B1

(12) United States Patent
Martinez et al.

(10) Patent No.: US 6,911,932 B1
(45) Date of Patent: Jun. 28, 2005

(54) TWO ANTENNA, TWO PASS INTERFEROMETRIC SYNTHETIC APERTURE RADAR

(75) Inventors: Ana Martinez, Albuquerque, NM (US); Armin W. Doerry, Albuquerque, NM (US); Douglas L. Bickel, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/695,304

(22) Filed: Oct. 28, 2003

(51) Int. Cl.[7] ............................................. G01S 13/90
(52) U.S. Cl. ................. 342/25 C; 342/25 R; 342/25 A; 342/25 F; 342/118; 342/123; 342/147; 342/156; 342/175; 342/195
(58) Field of Search ........................... 342/25, 118–146, 342/147, 156, 175, 192, 193–197, 417, 422, 423, 424, 25 R–25 F (56) References Cited

U.S. PATENT DOCUMENTS

| | | | | |
|---|---|---|---|---|
| 4,794,395 | A | * | 12/1988 | Cindrich et al. ............... 342/25 |
| 4,975,704 | A | * | 12/1990 | Gabriel et al. ................. 342/25 |
| 5,170,171 | A | * | 12/1992 | Brown .......................... 342/25 |
| 5,189,424 | A | * | 2/1993 | Brown .......................... 342/25 |
| 5,260,708 | A | * | 11/1993 | Auterman ..................... 342/25 |
| 5,463,397 | A | * | 10/1995 | Frankot ......................... 342/25 |
| 5,659,318 | A | * | 8/1997 | Madsen et al. ................ 342/25 |
| 5,677,693 | A | * | 10/1997 | Frankot et al. ................ 342/25 |
| 5,726,656 | A | * | 3/1998 | Frankot ......................... 342/25 |
| 5,867,119 | A | * | 2/1999 | Corrubia et al. ............. 342/194 |
| 6,150,972 | A | * | 11/2000 | Bickel et al. .................. 342/25 |
| 6,452,532 | B1 | * | 9/2002 | Grisham ....................... 342/25 |

OTHER PUBLICATIONS

Qian Lin et al., "Topography Estimation with Interferometric Synthetic Aperture Radar Using Fringe Detection", 1991 IEEE, 4 pgs.

W.W. Bonitant, Jr. et al., "Interferometric Height Estimation of the Seafloor Via Synthetic Aperture Sonar in the Presence of Motion Errors", IEEE Proc.–Radar, Sonar Navig., vol. 147, No. 6, Dec. 2000, pp. 322–330.

P. Piau, "Performances of the 3D–SAR Imagery", 1994 IEEE, 5 pgs.

(Continued)

Primary Examiner—Bernarr E. Gregory
(74) Attorney, Agent, or Firm—Madelynne Farber; Scott B. Stahl (57) ABSTRACT

A multi-antenna, multi-pass IFSAR mode utilizing data driven alignment of multiple independent passes can combine the scaling accuracy of a two-antenna, one-pass IFSAR mode with the height-noise performance of a one-antenna, two-pass IFSAR mode. A two-antenna, two-pass IFSAR mode can accurately estimate the larger antenna baseline from the data itself and reduce height-noise, allowing for more accurate information about target ground position locations and heights. The two-antenna, two-pass IFSAR mode can use coarser IFSAR data to estimate the larger antenna baseline. Multi-pass IFSAR can be extended to more than two (2) passes, thereby allowing true three-dimensional radar imaging from stand-off aircraft and satellite platforms.

22 Claims, 6 Drawing Sheets

OTHER PUBLICATIONS

Johan Jacob Mohr et al., "*Parametric Estimation of Time Varying Baselines in Airborne Interferometric SAR*", 1996 IEEE, 3 pgs.

David A. Yocky et al., "*Repeat–Pass Dual–Antenna Synthetic Aperture Radar Interferometric Change Detection Post–Processing*", 1997, Sandia National Laboratories SAND97–1198J, 13 pgs.

Robert Treuhaft et al., "*Estimating Vegetation and Surface Topographic Parameters from Multibaseline Radar Interferometry*", 1996 IEEE, 3 pgs.

Søren N. Madsen et al., "*Topographic Mapping Using Radar Interferometry: Processing Techniques*", IEEE Transactions on Geoscience and Remote Sensing, vol. 31, No. 1, Jan. 1993, pp. 246–256.

Dennis C. Ghiglia et al., "*Interferometric Synthetic Aperture Radar Terrain Elevation Mapping from Multiple Observations*", 1994, Sandia National Laboratories SAND94–0624C, 4 pgs.

Vincent Mrstik, *Terrain Height Measurement Accuracy of Interferometric Synthetic Aperture Radars*, IEEE Transactions on Geoscience and Remote Sensing, vol. 34, No. 1, Jan. 1996, pp. 219–228.

Richard E. Carande, "*Estimating Ocean Coherence Time Using Dual–Baseline Interferometric Synthetic Aperture Radar*", IEEE Transactions on Geoscience and Remote Sensing, vol. 32, No. 4, Jul. 1994, pp. 846–854.

* cited by examiner

FIG. 1

| PARAMETER | SYMBOL | VALUE |
|---|---|---|
| RANGES | R, $R_1$, $R_2$ | 5-10 KILOMETERS |
| BASELINE LENGTH BETWEEN ANTENNAS IN ONE ANTENNA PAIR | $b_1$, $b_2$ | 0.3-0.7 METERS |
| SYSTEM FREQUENCY | $f_0$ | 15 GHz |
| SYSTEM WAVELENGTH | $\lambda$ | 0.02 METERS |
| BASELINE LENGTH BETWEEN TWO ANTENNA PAIRS | B | 5-20 METERS |

TWO ANTENNA, TWO PASS INTERFEROMETRIC SYNTHETIC APERTURE RADAR

This invention was developed under Contract DE-AC04-94AL85000 between Sandia Corporation and the U.S. Department of Energy. The U.S. Government has certain rights in this invention.

FIELD OF THE INVENTION

The invention relates generally to data collection for topographic modeling and, more particularly, to two antenna, two pass interferometric synthetic aperture radar ("IFSAR").

BACKGROUND OF THE INVENTION

Interferometric synthetic aperture radar ("IFSAR") is a radar system used to obtain target height information and form multidimensional maps of imaged areas. IFSAR utilizes at least two (2) SAR images of the same scene, formed at slightly different elevation angles relative to each other, to extract information about target heights. Such images can be coherently combined to ascertain the topography of the imaged area and produce three-dimensional maps of the imaged area.

Currently, IFSAR utilizes two (2) principal operational modes. The first mode is two-antenna, one-pass IFSAR in which a single aircraft with two (2) antennas, displaced in a direction normal to the flight path of the aircraft, flies by the scene of interest once while collecting data. The second mode is one-antenna, two-pass IFSAR in which a single aircraft with a single antenna flies by the scene of interest twice, along slightly offset flight paths, while collecting data.

Each of these IFSAR operation modes possesses strengths and weaknesses. The two-antenna, one-pass mode allows for precise knowledge of baseline length, but often limits that baseline length. Additionally, residual system noise manifests itself as uncertainty in the topographic height estimates with lesser baseline lengths resulting in increased height-noise and limiting the effective topographic resolution. Because the one-antenna, two-pass mode allows a greater separation of the antennas, it allows a larger baseline, and thereby has a diminished sensitivity to system noise. Although it produces less height-noise, it suffers from imprecise knowledge of the baseline length (antenna separation) between passes, and consequently does not provide accurate target height scaling. Conventional navigation instruments are inadequate in measuring aircraft flight paths with suitable precision. Although a two-antenna, two-pass IFSAR has the potential to provide both the scaling accuracy of the two-antenna, one-pass mode and the height-noise performance of the one-antenna, two-pass mode, it currently does not have precise knowledge of the baseline length between passes.

It is well-known by workers in the art that the uncertainty in the target height decreases as the antenna baselines increases. By decreasing the uncertainty in the target's height, the accuracy of the resulting digital elevation model improves. One alternative for increasing the antenna baseline length entails equipping a single aircraft with additional antennas with suitable offsets to generate greater baselines. This is expensive and complicates the engineering. Additionally, flexing of the aircraft structure during flight may also be severe enough to render unacceptable uncertainty in the larger baselines without somewhat expensive baseline measurement schemes or devices.

It is therefore desirable to provide a solution that avoids the weaknesses of the aforementioned conventional IFSAR modes.

Exemplary embodiments of the invention permit data driven alignment of multiple independent passes, thereby providing the scaling accuracy of the two-antenna, one-pass mode and the height-noise performance of the one-antenna, two-pass mode. The antenna baseline between multiple flight passes can be accurately estimated from the data itself, thereby reducing both height-noise and scaling error and allowing for more accurate information about target ground position locations and heights.

BRIEF DESCRIPTION OF THE DRAWINGS

The above and further advantages of the invention may be better understood by referring to the following description in conjunction with the accompanying drawings in which corresponding numerals in the different figures refer to the corresponding parts, in which.

DETAILED DESCRIPTION

While the making and using of various embodiments of the present invention are discussed herein in terms of two-antenna, two-pass interferometric synthetic aperture radar ("IFSAR"), it should be appreciated that the present invention provides many inventive concepts that can be embodied in a wide variety of contexts. The specific embodiments discussed herein are merely illustrative of specific ways to make and use the invention, and are not meant to limit the scope of the invention.

The present invention provides a solution that enables data driven alignment of multiple independent passes, thereby providing the scaling accuracy of the two-antenna, one-pass IFSAR mode and the height-noise performance of the one-antenna, two-pass IFSAR mode. The two-antenna, two-pass IFSAR mode presented herein can accurately estimate the antenna baseline between two (2) flight passes from the data itself and reduce height-noise and scaling error, allowing for more accurate information about target ground position locations and heights. The two-antenna, two-pass IFSAR mode presented herein can use the data collected from each individual flight pass to estimate the antenna baseline length between the passes. True three-dimensional radar imaging from stand-off aircraft and satellite platforms can be obtained via multi-pass IFSAR which can allow for data collectiom from more than two (2) flight passes.

Figure 1:
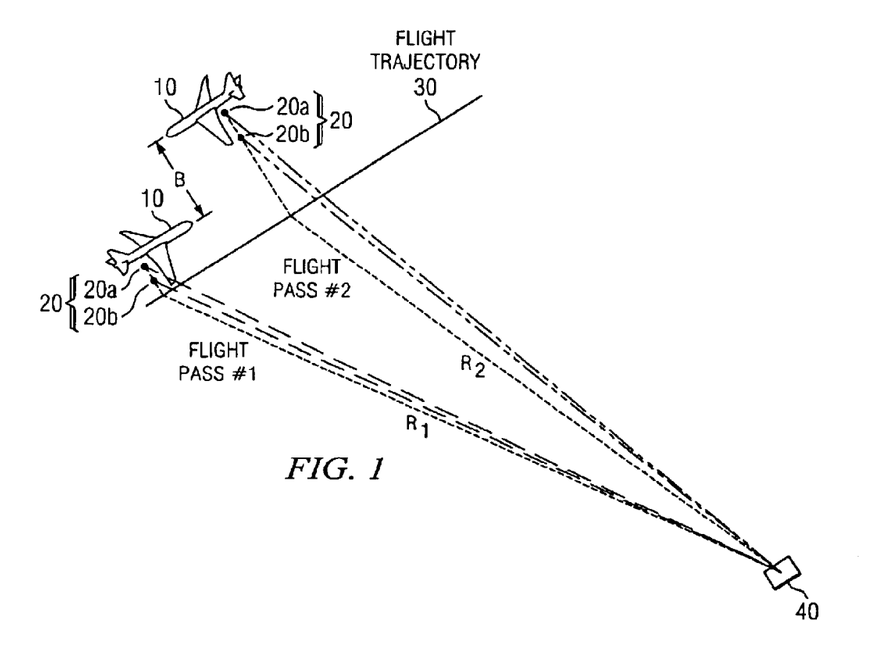
FIG. 1 diagrammatically illustrates exemplary flight passes for a two-antenna, two-pass IFSAR system in accordance with exemplary embodiments of the present invention.
Figure 1A:
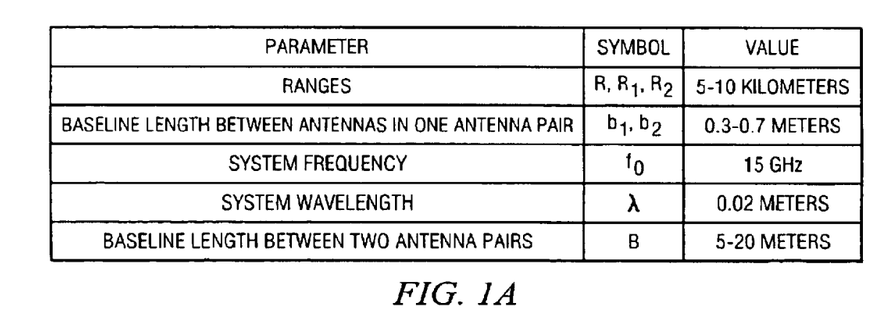
FIG. 1A displays a table of some exemplary parameters for a two-antenna, two-pass IFSAR system in accordance with the present invention.

FIG. 1 diagrammatically illustrates exemplary flight passes 1 and 2 for a two-antenna (20a and 20b), two-pass (1 and 2) IFSAR system in accordance with exemplary embodiments of the present invention. Aircraft 10, carrying antennas 20a and 20b (alternatively denoted as antenna pair 20), can perform flight passes 1 and 2 along flight trajectory 30 over scene of interest 40. Any type platform can be used to carry the radar system. Each flight pass can be performed at a different range, such as R1 and R2, from scene of interest 40. In some embodiments, each flight pass, such as flights passes 1 and 2, can possess a different elevation angle to scene of interest 40. Flight passes 1 and 2 are separated by a distance of B meters, therefore B represents the antenna baseline length between antenna pair 20 during flight pass 1 and antenna pair 20 during flight pass 2. In some embodiments, B may be on the order of tens of meters. In some embodiments, flight passes 1 and 2 are as close to parallel as possible (similar to the one-antenna, two-pass mode). However, since IFSAR has been shown to be possible with non-parallel flight paths, the data itself can also be used to calibrate the relative flight paths. Some exemplary parameters for a two-antenna, two-pass IFSAR system are given in the table of FIG. 1A. Despite modern navigation equipment, the antenna baseline length between two (2) flight passes is generally unknown at an accuracy and precision required to produce accurate target ground range position and height information for the imaged scene. While IFSAR topography measurements may be calibrated using ground-truth measurements, opportunities to collect such ground-truth measurements are not always available. Consequently, the antenna baseline length between flight passes needs to be accurately estimated by alternate means to yield improved ground range position and height accuracies.

Figure 2:
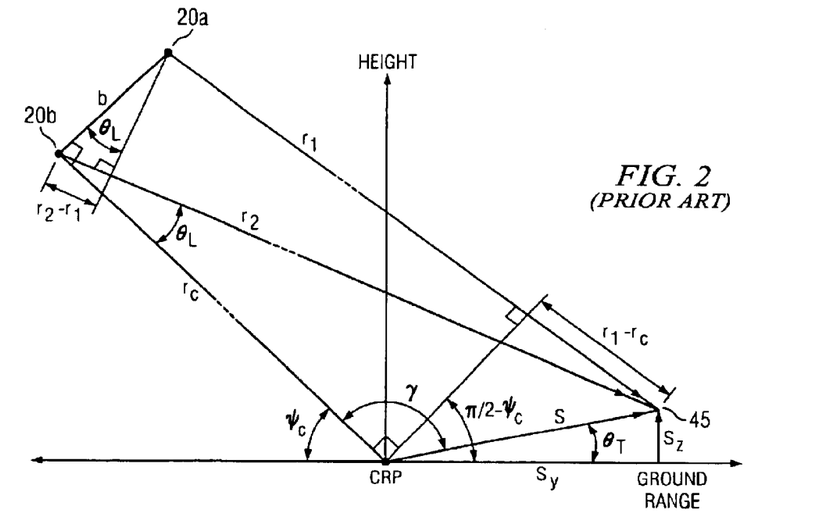
FIG. 2 diagrammatically illustrates geometry for a two-antenna, one-pass IFSAR system in accordance with the known art.
Figure 4:
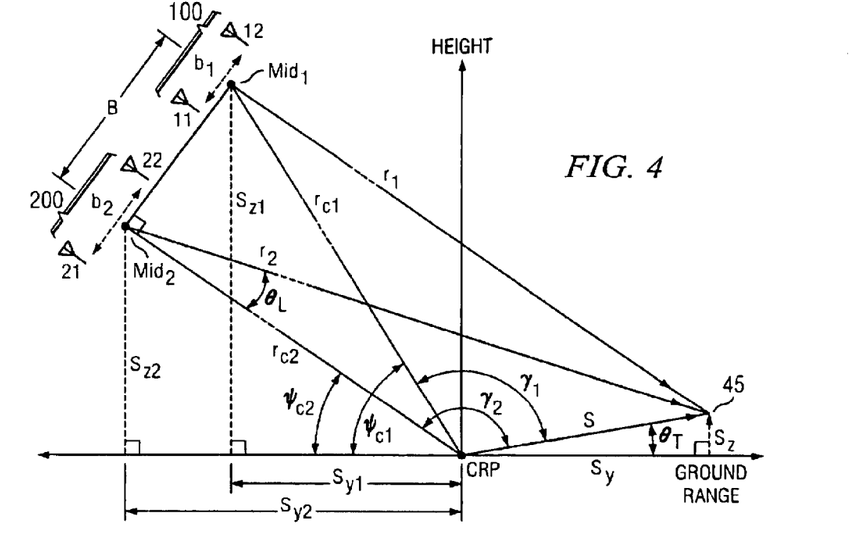
FIG. 4 diagrammatically illustrates geometry for a two-antenna, two-pass IFSAR system in accordance with exemplary embodiments of the present invention.

FIG. 2 diagrammatically illustrates geometry for a two-antenna, one-pass IFSAR system in accordance with the known art. In FIG. 2, the center of the scene is denoted as the scene's central reference point ("CRP"). In practice, distances (such as $r_1$ and $r_2$) between the target (such as target 45) and antennas (such as antennas 20a and 20b) are very large relative to the smaller antenna baseline lengths (such as b) and scene sizes (such as scene of interest 40, FIG. 1). Under these conditions, the equations for estimating the target's ground range position $s_y$ and height $s_z$ when antenna angle $\theta_L$ is positive are:

$$\hat{s}_y = s \cdot \sin(\psi_c) \cdot \left[1 - \left\{\frac{s^2 + r_c^2 - r_1^2}{2sr_c}\right\}^2\right]^{\frac{1}{2}} - \cos(\psi_c) \cdot \left[\frac{s^2 + r_c^2 - r_1^2}{2r_c}\right] \text{ and} \quad (1)$$

$$\hat{s}_z = s \cdot \sin(\psi_c) \cdot \left[\frac{s^2 + r_c^2 - r_1^2}{2r_c}\right] + s \cdot \cos(\psi_c) \cdot \left[1 - \left\{\frac{s^2 + r_c^2 - r_1^2}{2sr_c}\right\}^2\right]^{\frac{1}{2}}, \quad (2)$$

where $\psi_c$ represents the grazing angle of the radar system, which is conventionally available from the navigational system on the aircraft. Ranges $r_1$ and $r_c$ are also conventionally available from the navigational system, while distance s between the CRP and target 49 can be calculated from data conventionally available from the navigational system as discussed below with reference to FIG. 4.

Figure 3:
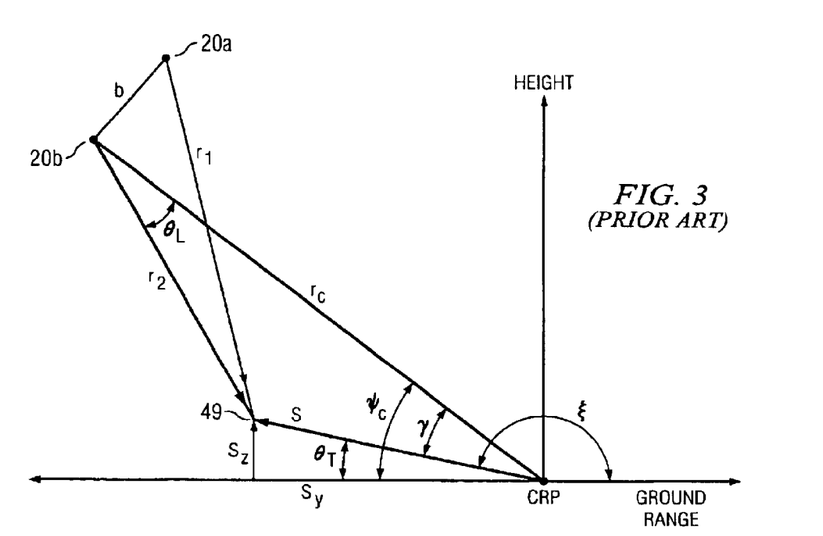
FIG. 3 diagrammatically illustrates geometry for a two-antenna, one-pass IFSAR system with a negative antenna angle in accordance with the known art.

FIG. 3 displays the geometry for a two-antenna, one-pass IFSAR system when antenna angle $\theta_L$ is negative. Range $r_2$ and angle γ are conventionally available from the aircraft's navigational system and distance s between the CRP and target 49 can be calculated from data conventionally available from the navigational system. Using the law of cosines, ξ is related to target angle $\theta_T$ by $(\pi-\theta_T)$ in radians or $(180°-\theta_T)$ in degrees. Target angle $\theta_T$ can be calculated as shown below:

$$\theta_T = \psi_c - \gamma \quad (3)$$

Using these equations, the target's ground range position $s_y$ and height $s_z$ estimation equations when antenna angle $\theta_L$ is negative are:

$$\hat{s}_y = s \cdot \sin(\psi_c) \cdot \left[1 - \left\{\frac{s^2 + r_c^2 - r_2^2}{2sr_c}\right\}^2\right]^{\frac{1}{2}} - \cos(\psi_c) \cdot \left[\frac{s^2 + r_c^2 - r_2^2}{2r_c}\right] \text{ and} \quad (4)$$

$$\hat{s}_z = \sin(\psi_c) \cdot \left[\frac{s^2 + r_c^2 - r_2^2}{2r_c}\right] - s \cdot \cos(\psi_c) \cdot \left[1 - \left\{\frac{s^2 + r_c^2 - r_2^2}{2sr_c}\right\}^2\right]^{\frac{1}{2}}. \quad (5)$$

Equations 1 and 2 use range $r_1$ with range $r_c$, while equations 4 and 5 use range $r_2$ with range $r_c$ due to the setup and geometry of the problem. The long range condition between the platform and the scene, the small scene size, and the small baseline length condition between the two (2) individual antennas are all valid, making range $r_1$ approximately equal to range $r_2$, both of which are conventionally available from the aircraft's navigational system. Consequently, equations 1 and 2 can be interchanged with equations 4 and 5. The explicit derivations for these equations are well known to workers in the art.

FIG. 4 diagrammatically illustrates geometry for a two-antenna, two-pass IFSAR system in accordance with exemplary embodiments of the present invention. Antennas 11 and 12 comprise an antenna pair (alternatively designated as 100) for a first flight pass and are separated by a distance of $b_1$ meters. Antennas 21 and 22 comprise an antenna pair (alternatively designated as 200) for a second flight pass and are separated by a distance of $b_2$ meters. The distances separating the antennas in each pair (i.e., $b_1$ and $b_2$) may differ and may be on the order of submeters (e.g., 0.3 meters).

Since it is conventionally known that the root mean square ("RMS") error associated with a target's ground range position and height estimates are inversely proportional to the antenna baseline length, it follows that a larger baseline length will yield smaller errors for these estimates.

Consequently, by utilizing the antenna baseline length B between two (2) passes rather than the antenna baseline length (i.e., $b_1$ or $b_2$) between two (2) antennas of a single pass (see FIG. 4) in conjunction with information from the flight passes, target ground range position $s_y$ and height $s_z$ scaling accuracies can be improved to the equivalent of the two-antenna, one-pass IFSAR system while retaining the height-noise performance associated with the one-antenna, two-pass IFSAR system. For a two-antenna, two-pass mode, midpoint $Mid_1$ between antennas 11 and 12 and midpoint $Mid_2$ between antennas 21 and 22 can be utilized as shown in FIG. 4. The equations below can calculate an estimate of the antenna baseline length B between midpoint $Mid_1$ of antenna pair 100 and midpoint $Mid_2$ of antenna pair 200. The distance from the scene's CRP to target 45 itself is:

$$s = \sqrt{s_y^2 s_z^2}. \qquad (6)$$

Using conventional trigonometric equations and identities with the recorded phase ($\psi_{c1}$ and $\psi_{c2}$) measurements, the ground range position and height of $Mid_1$ are:

$$s_{y_1} = r_{c_1} \cdot \cos(\psi_{c_1}) \qquad (7)$$

and $$s_{z_1} = r_{c_1} \cdot \sin(\psi_{c_1}). \qquad (8)$$

Similarly, the ground range position and height of $Mid_2$ are:

$$s_{y_2} = r_{c_2} \cdot \cos(\psi_{c_2}) \qquad (9)$$

and $$s_{z_2} = r_{c_2} \cdot \sin(\psi_{c_2}). \qquad (10)$$

The range ($r_{c1}$ and $r_{c2}$) and phase ($\psi_{c1}$ and $\psi_{c2}$) measurements are conventionally available from the aircraft's navigational system.

Using these two coordinate pairs, the estimation equation for antenna baseline length B between the two (2) flight passes is:

$$\hat{B} = \sqrt{(s_{z_1} - s_{z_2})^2 + (s_{y_1} - s_{y_2})^2}. \qquad (11)$$

Figure 5:
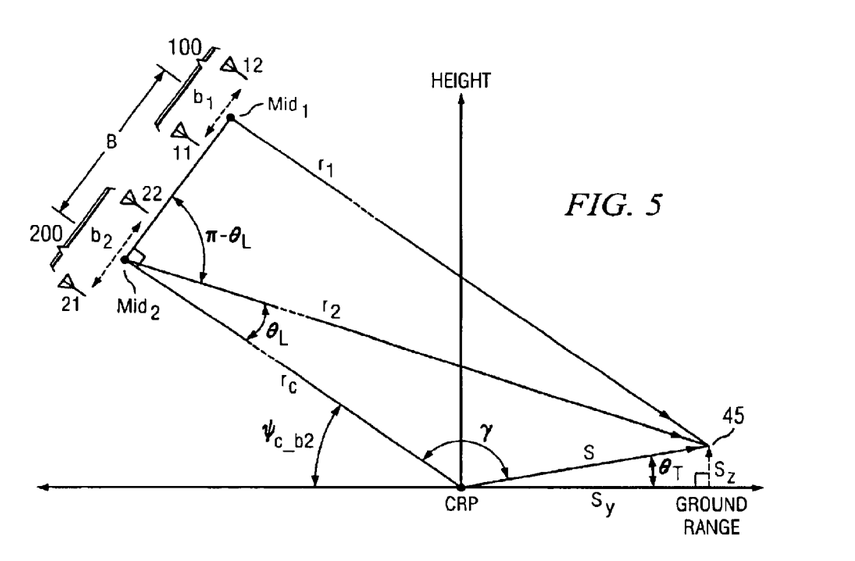
FIG. 5 diagrammatically illustrates two antenna pairs and pertinent geometry for an IFSAR system in accordance with exemplary embodiments of the present invention.

This result can be used to re-estimate the target's ground range position $s_y$ and height $s_z$ for a two-antenna, two-pass IFSAR system, resulting in refined estimates of the target's ground range position $s_y$ and height $s_z$. When using multiple targets to calculate the antenna baseline estimate, equations 7–11 can be calculated for each of the targets and the resulting baseline estimates averaged to obtain $\hat{B}$. FIG. 5 is similar to FIG. 4 and diagrammatically illustrates two antenna pairs (antennas 11 and 12, alternatively designated as antenna pair 100, and antennas 21 and 22, alternatively designated as antenna pair 200) and pertinent geometry for an IFSAR system in accordance with exemplary embodiments of the present invention. Using antenna baseline length $\hat{B}$ between the two (2) flight passes (equation 11), the equation for antenna angle $\theta_L$ becomes:

$$\theta_L = \sin^{-1}\left(\frac{\hat{B}}{2r_2} + \frac{\lambda(\phi + 2\pi \cdot m)}{4\pi\hat{B}} - \frac{\lambda^2(\phi + 2\pi \cdot m)^2}{32\pi^2 \hat{B} r_2}\right). \qquad (12)$$

This equation can account for phase ambiguities where the variable 'm' represents the integer ambiguity index. As conventionally known, there are ambiguities in the phase due to the fact that the phase is equivalent every $2\pi$ radians. The possible values of 'm' are bounded by the navigational system and can be generated as conventionally known to workers in the art. In some embodiments, equation 12 can be calculated once for each 'm' value. Also, $\lambda$ is the system wavelength (e.g., 0.02 meters as in FIG. 1A), and $\phi$ is the phase difference conventionally calculated as the difference in the range times the constant $2\pi/\lambda$ (i.e., $\phi = (2\pi/\lambda)*(r_2 - r_1)$).

If equation 12 yields a positive antenna angle $\theta_L$, and noting that ranges $r_2$ and $r_c$ are conventionally available from the aircraft's navigational system while distance s from the scene's CRP to target 45 can be calculated from data conventionally available from the navigational system, the following refined estimation equations apply:

$$\hat{s}_y = s \cdot \sin(\psi_c) \cdot \left[1 - \left\{\frac{s^2 + r_c^2 - r_2^2}{2sr_c}\right\}^2\right]^{\frac{1}{2}} - \cos(\psi_c) \cdot \left[\frac{s^2 + r_c^2 - r_2^2}{2r_c}\right] \qquad (13)$$

$$\hat{s}_z = \sin(\psi_c) \cdot \left[\frac{s^2 + r_c^2 - r_2^2}{2r_c}\right] + s \cdot \cos(\psi_c) \cdot \left[1 - \left\{\frac{s^2 + r_c^2 - r_2^2}{2sr_c}\right\}^2\right]^{\frac{1}{2}}. \qquad (14)$$

If antenna angle $\theta_L$ is negative in equation 12, the appropriate refined estimation equations become:

$$\hat{s}_y = s \cdot \sin(\psi_c) \cdot \left[1 - \left\{\frac{s^2 + r_c^2 - r_2^2}{2sr_c}\right\}^2\right]^{\frac{1}{2}} - \cos(\psi_c) \cdot \left[\frac{s^2 + r_c^2 - r_2^2}{2r_c}\right] \qquad (15)$$

$$\hat{s}_z = \sin(\psi_c) \cdot \left[\frac{s^2 + r_c^2 - r_2^2}{2r_c}\right] + s \cdot \cos(\psi_c) \cdot \left[1 - \left\{\frac{s^2 + r_c^2 - r_2^2}{2sr_c}\right\}^2\right]^{\frac{1}{2}}. \qquad (16)$$

Equations 13 and 14 are similar to equations 1 and 2, but use range $r_2$ rather than range $r_1$, while equations 15 and 16 are the same as equations 4 and 5 (all use range $r_2$). As discussed above with reference to equations 1, 2, 4, and 5, the long range condition between the platform and the scene, the small scene size, and the small baseline length condition between the two (2) individual antennas are all valid, making range $r_1$ approximately equal to range $r_2$. Also in equations 13–16, $r_c$ can be either $r_{c1}$ or $r_{c2}$ with its corresponding $\psi_c$ value ($\psi_{c1}$ or $\psi_{c2}$, respectively). (It is $r_{c2}$ and $\psi_{c2}$ in FIG. 10 described below.)

Figure 10:
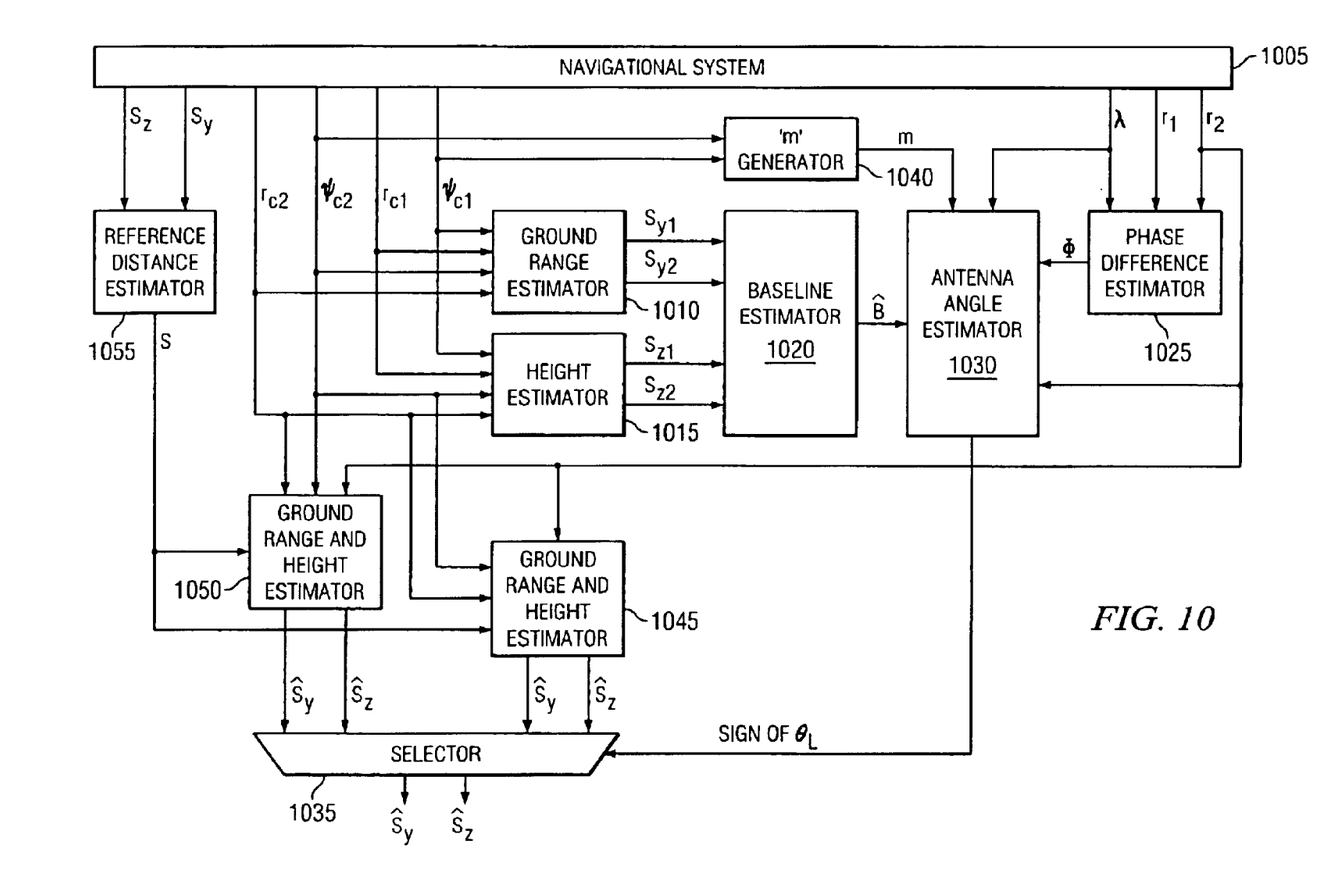
FIG. 10 diagrammatically illustrates an exemplary embodiment of an apparatus for implementing a two-antenna, two-pass IFSAR in accordance with the present invention.

FIG. 10 diagrammatically illustrates exemplary embodiments of an apparatus for implementing a two-antenna, two-pass IFSAR in accordance with the present invention. The aircraft's navigational system 1005 can supply ranges $r_1$, $r_2$, $r_{c1}$ and $r_{c2}$, phase measurements $\psi_{c1}$ and $\psi_{c2}$, target ground range $s_y$, target height $s_z$, and system wavelength $\lambda$. With $r_{c1}$, $r_{c2}$, $\psi_{c1}$, and $\psi_{c2}$ as inputs, ground range estimator 1010 implements equations 7 and 9, outputting ground range estimates $s_{y1}$ and $s_{y2}$, and height estimator 1015 implements equations 8 and 10, outputting height estimates $s_{z1}$ and $s_{z2}$. Baseline estimator 1020 receives the outputs of ground range estimator 1010 and height estimator 1015 and, implementing equation 11, produces antenna baseline estimate $\hat{B}$ which is input to antenna angle estimator 1030. With $\psi_{c1}$ and $\psi_{c2}$ as inputs, 'm' generator 1040 generates a range of 'm' values which are input to antenna angle estimator 1030. Phase difference estimator 1025 receives ranges $r_1$ and $r_2$ and system wavelength $\lambda$ from navigational system 1005.

Phase difference estimator 1025 implements the equation $((2\pi/\lambda)*(r_2-r_1))$ to produce $\phi$ which is input to antenna angle estimator 1030. Using $\hat{B}$, m, and $\phi$ along with $\lambda$ and $r_2$ from navigational system 1005, antenna angle estimator 1030 implements equation 12 and produces an estimate of antenna angle $\theta_L$. Selector 1035 receives from antenna angle estimator 1030 a positive/negative indication for $\theta_L$. Based on the sign of $\theta_L$, selector 1035 will select either ground range and height estimator 1045 or ground range and height estimator 1050. Ground range and height estimator 1045 implements equations 15 and 16 for a negative $\theta_L$ and ground range and height estimator 1050 implements equations 13 and 14 for a positive $\theta_L$. Reference distance estimator 1055 receives $s_y$ and $s_z$ from navigational system 1005, implements equation 6, and produces distance s (the distance from the scene's central reference point to the target) which is input to both ground range and height estimators 1045 and 1050. In the exemplary embodiments of FIG. 10, both ground range and height estimators 1045 and 1050 receive ranges $r_2$, $r_{c2}$, and phase measurement $\psi_{c2}$ from navigational system 1005 and distance s from reference distance estimator 1055 for use in producing refined ground range and height estimations $\hat{s}_y$ and $\hat{s}_z$.

Figure 6:
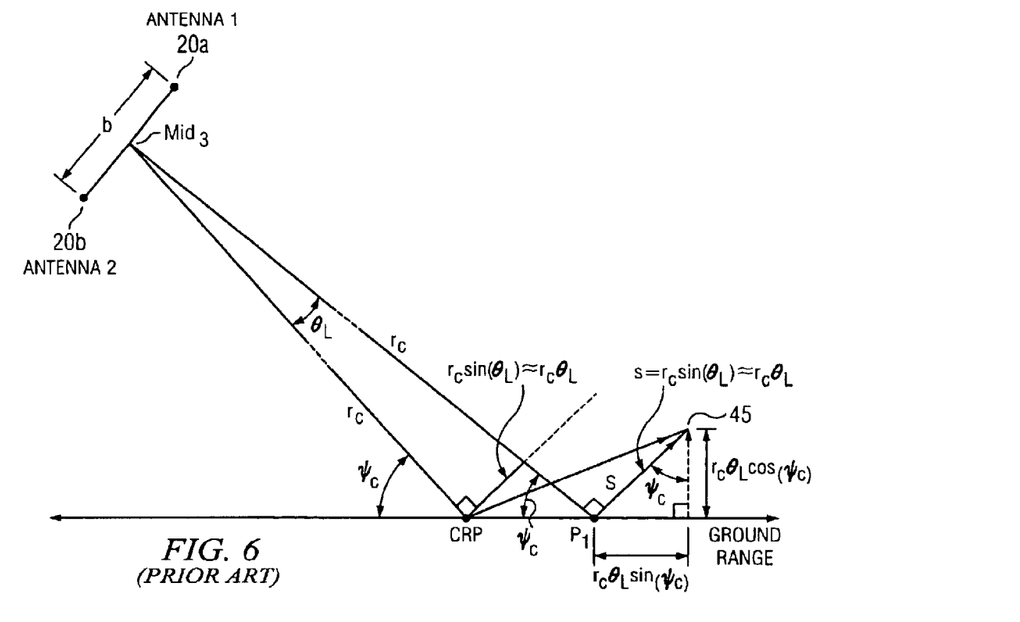
FIG. 6 diagrammatically illustrates a single antenna pair and pertinent geometry for an IFSAR system in accordance with the known art.

The uncertainties in a target's ground range position and height estimates for a two-antenna, one-pass IFSAR system in the presence of noise can be derived with reference to FIG. 6 wherein antennas 20a and 20b (i.e., a single antenna pair) are located on the order of kilometers away from a scene of interest that includes central reference point CRP. These uncertainties are known to workers in the art. In FIG. 6, the scene size is small compared to range $r_c$, and height $s_z$ from the ground to target 45 on a first order approximation is equal to:

$$s_z \approx r_c \cdot \theta_L \cdot \cos(\psi_c). \quad (17)$$

Here, grazing angle $\psi_c$ is constant and antenna angle $\theta_L$ varies. Under small scene size and long range constraints, point $P_1$ is approximately the same distance from the radar platform as the CRP on a first order basis. Therefore, the distance between CRP and $P_1$ is very small in comparison to range $r_c$. Under small antenna angle conditions and using first order partial derivative concepts as known in the art, the uncertainties in target 45 ground range position $s_y$ and height $s_z$ for a two-antenna, one-pass IFSAR system reduce to the following well known approximations:

$$\sigma_{s_y}^2 \approx \frac{\lambda^2 \cdot r_c^2 \cdot \sin^2(\psi_c)}{16 b^2 \pi^2 \cdot SNR} \text{ and} \quad (18)$$

$$\sigma_{s_z}^2 \approx \frac{\lambda^2 \cdot r_c^2 \cdot \cos^2(\psi_c)}{16 b^2 \pi^2 \cdot SNR} \quad (19)$$

respectively, where, as known by workers in the art, the phase variance is related to the signal to noise ratio ("SNR") as:

$$\sigma_\phi^2 = \frac{1}{SNR}. \quad (20)$$

The uncertainties in a target's ground range position $s_y$ and height $s_z$ estimates for exemplary embodiments of a two-antenna, two-pass IFSAR system in the presence of noise can be derived with reference to FIG. 4. Using the antenna baseline length estimation equation (Equation 11), the uncertainty in antenna baseline length B can be calculated in terms of the uncertainty in the difference between the antenna pairs' midpoint ($Mid_1$ and $Mid_2$) height coordinates (i.e., the difference $s_{z1}-s_{z2}$) and the uncertainty in the difference between the ground range coordinates for these two midpoints (i.e., the difference $s_{y1}-s_{y2}$). The overall antenna baseline uncertainty with respect to the uncertainties in both of these two (2) differences is:

$$\sigma_B^2 = [\sigma_B^2 | \sigma_{(s_{y1}-s_{y2})}^2] + [\sigma_B^2 | \sigma_{(s_{z1}-s_{z2})}^2]. \quad (21)$$

After computing the two (2) individual components in the antenna baseline length uncertainty, the uncertainty in grazing angle $\psi_{c1}$ can be utilized to obtain the final baseline uncertainty equation. Using the geometry in FIG. 4, this overall uncertainty becomes:

$$\sigma_B^2 = \frac{1}{s^2 \cdot M \cdot SNR} \cdot \{(r_{c_1} - r_{c_2})^2 \cdot \cos^2(\psi_{c_1})\} \cdot \quad (22)$$

$$\left\{ \frac{r_1^2 \cdot \lambda^2 \cdot \cos^2(\psi_{c_2})}{16\pi^2 \cdot b_2^2} + \frac{r_1^2 \cdot \lambda^2}{32\pi^2 \left( r_{c_1}^2 - \frac{(r_{c_1}^2 + s^2 - r_1^2)^2}{4s^2} \right)} + \right.$$

$$\left. \frac{(-s^2 + r_{c_1}^2 - r_1^2)^2 \cdot r_1^2 \cdot \lambda^2}{16\pi^2 \cdot b_2^2 \cdot (2r_1^2(s^2 + r_{c_1}^2) - (s^2 - r_{c_1}^2)^2 - r_1^4)} \right\}$$

Figure 7:
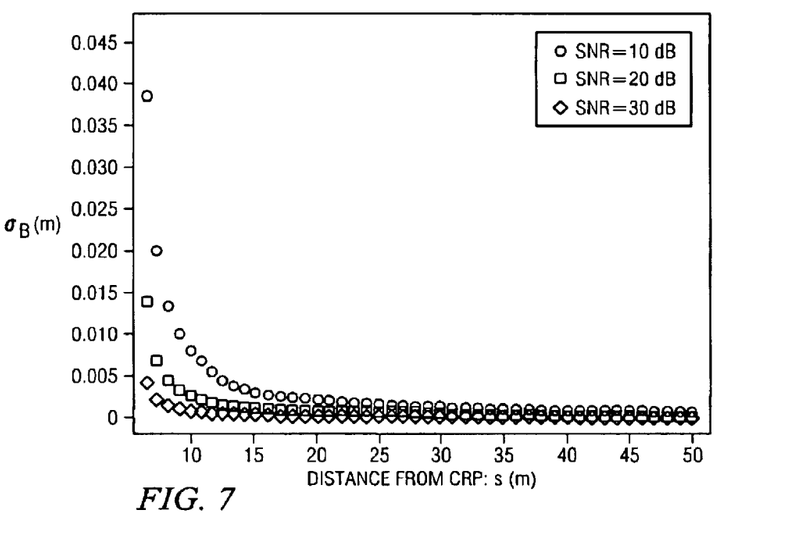
FIG. 7 graphically illustrates RMS values for baseline uncertainty in accordance with exemplary embodiments of the present invention.

This equation assumes the use of M independent targets to calculate the antenna baseline length estimate. That is, in some embodiments, baseline estimator 1020 of FIG. 10 can implement equations 7–11 for each of M targets and then average the M results to obtain its output baseline length estimate $\hat{B}$. The baseline uncertainty in terms of the RMS from a single target's measurements is shown in FIG. 7. The RMS for the antenna baseline length uncertainty is plotted as a function of SNR and the distance from the target to the scene's CRP.

Two observations can be made from the baseline standard deviation presented in FIG. 7. First, as the SNR increases, the standard deviation of the baseline length estimate decreases because as the signal power increases relative to the noise power, the overall SNR increases. As signal noise decreases, the uncertainties in estimating the antenna baseline, the target location, and the target height also decrease. The second observation is that as the target moves farther away from the scene's CRP (i.e., the distance from the scene's CRP increases), the uncertainty in the baseline length estimate decreases because the baseline length uncertainty is inversely proportional to the target's distance from the scene's CRP. As the distance increases, the baseline length uncertainty will converge to zero since the first term in the brackets in Equation 22 will dominate the other two terms. From these two observations, if can be inferred that the exemplary conditions for accurately estimating the antenna baseline length between the two antenna pairs is to utilize a high SNR with targets located as far away as possible from the scene's CRP within the scene of interest. In other words, large target swaths are better for estimating baseline lengths than narrow target swaths.

In a two-antenna, two-pass IFSAR system, the refined estimates of target ground range position $s_y$ and height $s_z$ estimates also possess uncertainties. These uncertainties, respectively, are:

$$\sigma_{s_y}^2 = (r_c \cdot \sin(\psi_c))^2 \cdot \sigma_{\theta_L}^2 \quad (23)$$

and $$\sigma_{s_z}^2 = (r_c \cdot \cos(\psi_c))^2 \cdot \sigma_{\theta_L}^2. \quad (24)$$

Using the antenna baseline length B between the two antenna pairs (such as 100 and 200), the uncertainty in the antenna angle $\theta_L$ becomes:

$$\sigma_{\theta_L}^2 = \frac{1}{SNR} \cdot \left( \frac{\lambda}{4\pi B} - \frac{\lambda^2 \phi}{16\pi^2 B r_2} \right)^2 + \quad (25)$$

$$\left( \frac{1}{2r_2} - \frac{\lambda \phi}{4\pi B^2} + \frac{\lambda^2 \phi^2}{32\pi^2 B^2 r_2} \right)^2 \cdot \sigma_B^2.$$

It is evident from the above three equations that as the antenna baseline length estimation uncertainty increases, the uncertainties in both the target ground range position $s_y$ and height $s_z$ also increase. Utilizing the uncertainty in antenna angle $\theta_L$ in Equation 25 with the uncertainty in the antenna baseline length B in Equation 22, the uncertainty in estimating the target's refined ground range position $s_y$ is:

$$\sigma_{s_y}^2 = \frac{1}{SNR} \cdot \left\{ \left( \frac{\lambda}{4\pi B} - \frac{\lambda^2 \phi}{16\pi^2 B r_2} \right)^2 \cdot (r_c \cdot \sin(\psi_c))^2 \right\} + \quad (26)$$

$$\frac{1}{s^2 \cdot M \cdot SNR} \cdot \left\{ (r_c \cdot \sin(\psi_c))^2 \cdot \right.$$

$$((r_{c_1} - r_{c_2})^2 \cdot \cos^2(\psi_{c_1})) \cdot \left( \frac{1}{2r_2} - \frac{\lambda \phi}{4\pi B^2} + \frac{\lambda^2 \phi^2}{32\pi^2 B^2 r_2} \right)^2 \cdot$$

$$\left\{ \frac{r_1^2 \cdot \lambda^2 \cdot \cos^2(\psi_{c_2})}{16\pi^2 \cdot b^2} + \frac{r_1^2 \cdot \lambda^2}{32\pi^2 \left( r_{c_1}^2 - \frac{(r_{c_1}^2 + s^2 - r_1^2)^2}{4s^2} \right)} + \right.$$

$$\left. \left. \frac{(-s^2 + r_{c_1}^2 - r_1^2)^2 \cdot r_1^2 \cdot \lambda^2}{16\pi^2 \cdot b^2 \cdot (2r_1^2(s^2 + r_{c_1}^2) - (s^2 - r_{c_1}^2)^2 - r_1^4)} \right\} \right\}$$

where M targets are used to estimate the antenna baseline length B between two antenna pairs (such as 100 and 200). On a first order approximation, the uncertainty in the target ground range position $s_y$ with respect to the antenna baseline length B between two antenna pairs (such as 100 and 200) becomes the well known expression:

$$\sigma_{s_y}^2 = \frac{\lambda^2 \cdot r_c^2 \cdot \sin^2(\psi_c)}{16\pi^2 \cdot SNR \cdot B^2}. \quad (27)$$

Figure 8:
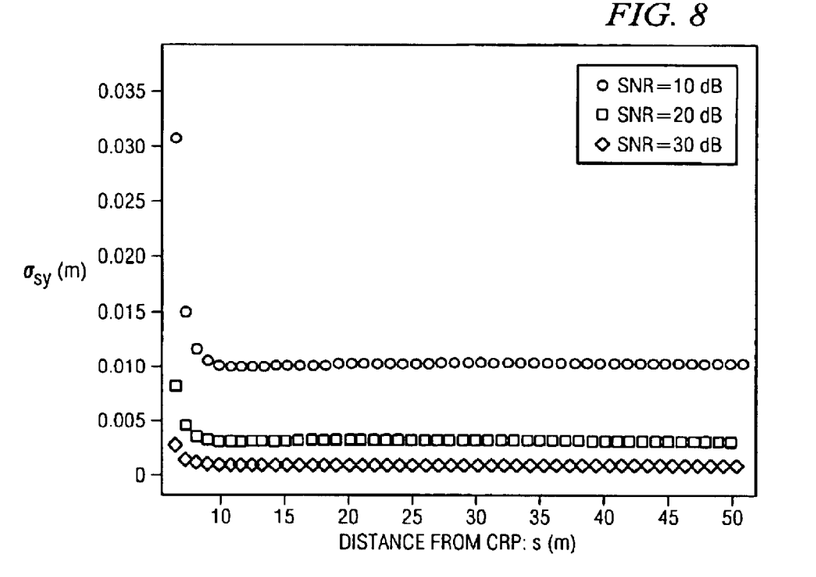
FIG. 8 graphically illustrates RMS uncertainty values for a target's ground range position in accordance with exemplary embodiments of the present invention.

FIG. 8 displays the RMS values for the target's refined ground range position $s_y$ error uncertainty. In this figure, as the SNR increases, the RMS values in the uncertainty decrease. This is also true for the target's distance from the scene's CRP. Targets located farther away from the scene's CRP within the scene of interest possess smaller RMS values in the ground range position $s_y$ uncertainties than targets located closer to the scene's CRP. As seen from the first order approximation, the ground range position $s_y$ uncertainty will converge to the value in Equation 27.

Using M targets to estimate the antenna baseline length B between two antenna pairs (such as 100 and 200), the uncertainty in the target's refined height $s_z$ estimate is:

$$\sigma_{s_z}^2 = \frac{1}{SNR} \cdot \left\{ \left( \frac{\lambda}{4\pi B} - \frac{\lambda^2 \phi}{16\pi^2 B r_2} \right)^2 \cdot (r_c \cdot \sin(\psi_c))^2 \right\} + \quad (28)$$

$$\frac{1}{s^2 \cdot M \cdot SNR} \cdot \left\{ (r_c \cdot \cos(\psi_c))^2 \cdot ((r_{c_1} - r_{c_2})^2 \cdot \cos^2(\psi_{c_1})) \cdot \right.$$

$$\left( \frac{1}{2r_2} - \frac{\lambda \phi}{4\pi B^2} + \frac{\lambda^2 \phi^2}{32\pi^2 B^2 r_2} \right)^2 \cdot$$

$$\left\{ \frac{r_1^2 \cdot \lambda^2 \cdot \cos^2(\psi_{c_2})}{16\pi^2 \cdot b^2} + \frac{r_1^2 \cdot \lambda^2}{32\pi^2 \left( r_{c_1}^2 - \frac{(r_{c_1}^2 + s^2 - r_1^2)^2}{4s^2} \right)} + \right.$$

$$\left. \left. \frac{(-s^2 + r_{c_1}^2 - r_1^2)^2 \cdot r_1^2 \cdot \lambda^2}{16\pi^2 \cdot b^2 \cdot (2r_1^2(s^2 + r_{c_1}^2) - (s^2 - r_{c_1}^2)^2 - r_1^4)} \right\} \right\}.$$

On a first order approximation, the uncertainty in the target height $s_z$ with respect to the antenna baseline length B between two antenna pairs (such as 100 and 200) becomes the well known expression:

$$\sigma_{s_z}^2 = \frac{\lambda^2 \cdot r_c^2 \cdot \cos^2(\psi_c)}{16\pi^2 \cdot SNR \cdot B^2}. \quad (27)$$

It can therefore be inferred that in order to decrease the uncertainty in the target height $s_z$, bigger antenna baselines B are necessary. Similar to the ground range position $s_y$ uncertainty, the target height $s_z$ uncertainty converges to the first order approximation shown in Equation 29.

Figure 9:
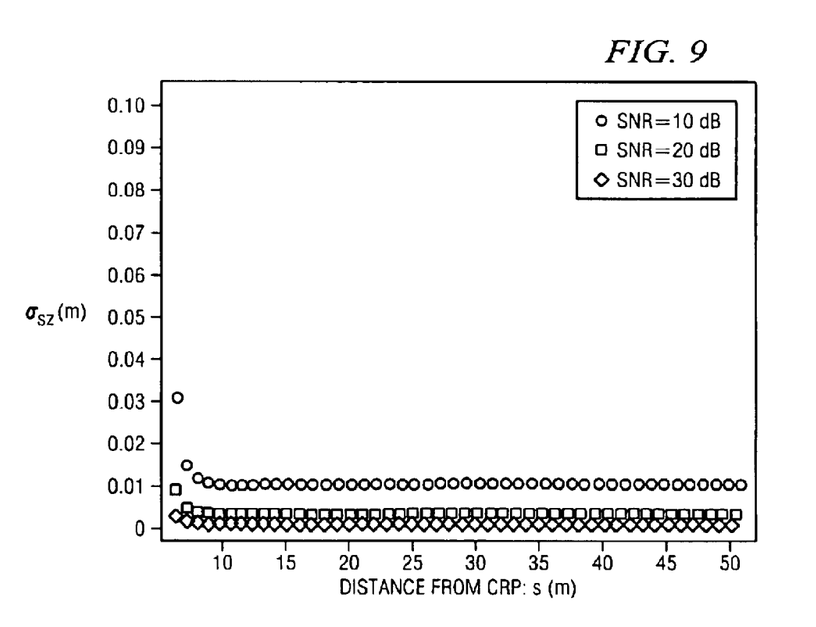
FIG. 9 graphically illustrates RMS uncertainty values for a target's height in accordance with exemplary embodiments of the present invention.

FIG. 9 displays the RMS uncertainty values for estimating the target's refined height $s_z$ in terms of the SNR and the target's distance from the scene's CRP. Similar to the observations from the target's refined ground range position $s_y$ estimation procedure, the RMS uncertainty values for the refined height $s_z$ estimates decrease as the SNR is increased and as the target moves farther away from the scene's CRP within the scene of interest.

It will be evident to workers in the art that the exemplary embodiments described above can be readily implemented by suitable modifications in software, hardware or a combination of software and hardware in conventional topographic modeling systems, such as IFSAR systems.

Although exemplary embodiments of the present invention have been described in detail, it will be understood by workers in the art that various modifications can be made therein without departing from the spirit and scope of the invention as set forth in the appended claims.

What is claimed is:

1. A method of estimating information about a target based on data from a plurality of flight passes, the method comprising:

determining first information from a first flight pass of an antenna pair carried together on an aircraft, the first information specifying a first geometric relationship between the first flight pass and a reference point;

determining second information from a second flight pass of an antenna pair carried together on an aircraft, the second information specifying a second geometric relationship between the second flight pass and said reference point;

applying geometric analysis to the first and second geometric relationships to estimate an antenna baseline length between the first and second flight passes; and estimating one of a ground range position and height of the target based on the antenna baseline length estimate and one of the first and second geometric relationships.

2. The method of claim 1, wherein each of said determining steps includes producing for the corresponding flight pass range and phase measurements relative to the reference point.

3. The method of claim 2, wherein each said producing step includes producing the range and phase measurements relative to a predetermined point spatially associated with the corresponding antenna pair.

4. The method of claim 3, wherein said applying step includes, for each antenna pair, using the range and phase measurements to determine a distance from the reference point to a groundpoint beneath the predetermined point wherein an approximately straight line drawn from the groundpoint to the predetermined point forms approximately a right angle with a horizontal plane containing the reference point.

5. The method of claim 3, wherein said applying step includes, for each antenna pair, suing the range and phase measurements to determine a distance from the predetermined point to a groundpoint beneath the predetermined point wherein an approximately straight line drawn from the groundpoint to the predetermined point forms approximately a right angle with a horizontal plane containing the reference point.

6. The method of claim 3, wherein the predetermined point is a midpoint between the corresponding antenna pair.

7. The method of claim 1, wherein said applying step includes using the first and second geometric relationships to produce respective first and second sets of ground range and height information.

8. The method of claim 7, wherein said applying step includes calculating a difference between the ground range information of said sets and a difference between the height information of said sets, squaring each of the differences, adding the squared differences, and taking the square root of the sum of the squared differences.

9. The method of claim 7, wherein said applying step includes providing each set of ground range information and height information measured relative to the reference point and a predetermined point spatially associated with the corresponding antenna pair.

10. The method of claim 1, wherein said estimating step includes using the baseline length to calculate an antenna angle formed between a line from the reference point to a predetermined point spatially associated with one of the antenna pairs and a line from the predetermined point to the target.

11. The method of claim 10, wherein said estimating step includes determining a sign of the antenna angle.

12. The method of claim 11, wherein the sign of the antenna angle is positive when the reference point is located horizontally between the predetermined point and the target.

13. The method of claim 11, wherein the sign of the antenna angle is negative when the target is located horizontally between the reference point and the predetermined point.

14. The method of claim 11, wherein said estimating step includes estimating one of the ground range position and the height of the target based on the sign of the antenna angle.

15. The method of claim 1, wherein both the first and second flight passes involve the same antenna pair.

16. The method of claim 1, wherein said estimating step includes estimating both the ground range position and the height of the target based on the antenna baseline length and one of the first and second geometric relationships.

17. An apparatus for estimating information about a target based on data from a plurality of flight passes, the apparatus comprising:
   an input for receiving first information determined from a first flight pass of an antenna pair carried together on an aircraft, and second information determined from a second flight pass of an antenna pair carried together on an aircraft, the first information specifying a first geometric relationship between the first flight pass and a reference point, and the second information specifying a second geometric relationship between the second flight pass and said reference point;
   a distance estimator coupled to said input for applying geometric analysis to said first and second geometric relationships to estimate an antenna baseline length between the first and second flight passes; and
   a target information estimator coupled to said input and said distance estimator for estimating one of a ground range position and height of the target based on the antenna baseline length estimate and one of the first and second geometric relationships.

18. The apparatus of claim 17, wherein said distance estimator includes a ground range estimator for producing a ground range estimate and a height estimator for producing a height estimate.

19. The apparatus of claim 17, wherein said target information estimator includes an antenna angle estimator for determining an antenna angle and a sign of the antenna angle.

20. The apparatus of claim 19, wherein the sign of the antenna angle is positive when the reference point is located horizontally between a predetermined point spatially associated with the corresponding antenna pair and the target and negative when the target is between the reference point and the predetermined point.

21. The apparatus of claim 19, wherein said target information estimator includes both a ground range position estimator for producing the ground range position of the target and a height estimator for producing the height of the target.

22. The apparatus of claim 21, wherein said height estimator is for producing first and second height estimates and said ground range position estimator is for producing first and second ground range estimates, said target information estimator including a selector coupled to said antenna angle estimator, said ground range position estimator, and said height estimator for selecting one of the first and second ground range position estimates and one of the first and second height estimates based on the sign of the antenna angle.

* * * * *